United States Patent [19]

Leiber et al.

[11] 3,793,545
[45] Feb. 19, 1974

[54] SPEED SENSING APPARATUS
[75] Inventors: Heinz Leiber, Leimen; Dieter-Helmut Thom, Heidelberg; Anton Frenznick, Rauenberg, all of Germany
[73] Assignee: Teldix G.m.b.H., Heidelberg, Germany
[22] Filed: Mar. 10, 1972
[21] Appl. No.: 233,683

[30] Foreign Application Priority Data
Mar. 10, 1971 Germany............................ 2111499
Sept. 3, 1971 Germany............................ 2144162

[52] U.S. Cl. ............................................. 310/168
[51] Int. Cl. ........................................... H02k 19/24
[58] Field of Search ... 310/168, 169, 170, 155, 171, 310/75, 79

[56] References Cited
UNITED STATES PATENTS
| 3,551,712 | 12/1970 | Jones | 310/168 |
| 3,541,369 | 11/1970 | Murakami | 310/168 |
| 2,556,471 | 6/1951 | Elam | 310/155 |
| 3,652,886 | 3/1972 | Riordan | 310/168 |
| 3,509,395 | 4/1970 | Schrecongost | 310/168 |
| 3,328,614 | 6/1967 | Falge | 310/168 |
| 3,564,313 | 2/1971 | Goor | 310/168 |
| 3,515,921 | 6/1970 | De Lange | 310/168 |

FOREIGN PATENTS OR APPLICATIONS
1,336,035  6/1963  France............................... 310/168

Primary Examiner—R. Skudy
Attorney, Agent, or Firm—Spencer & Kaye

[57] ABSTRACT

An electromagnetic rotational speed sensing apparatus includes a magnetic circuit formed by a rotor, a stator and an air gap between the rotor and the stator. The rotor has a surface provided with recesses or teeth. The stator is provided with an electromagnetic sensor. The air gap is changeable in size during rotation of the rotor by the teeth or recesses. A stationary support is provided which movably supports the stator to permit movement towards and away from the rotor. Support members are provided (e.g. spreading or clamping members) which permit such movement only upon overcoming substantial static friction. The oppositely disposed surface portions of the stator and the rotor are developed to permit possible contact between them without damage.

27 Claims, 19 Drawing Figures 3,793,545

SECTION A-B

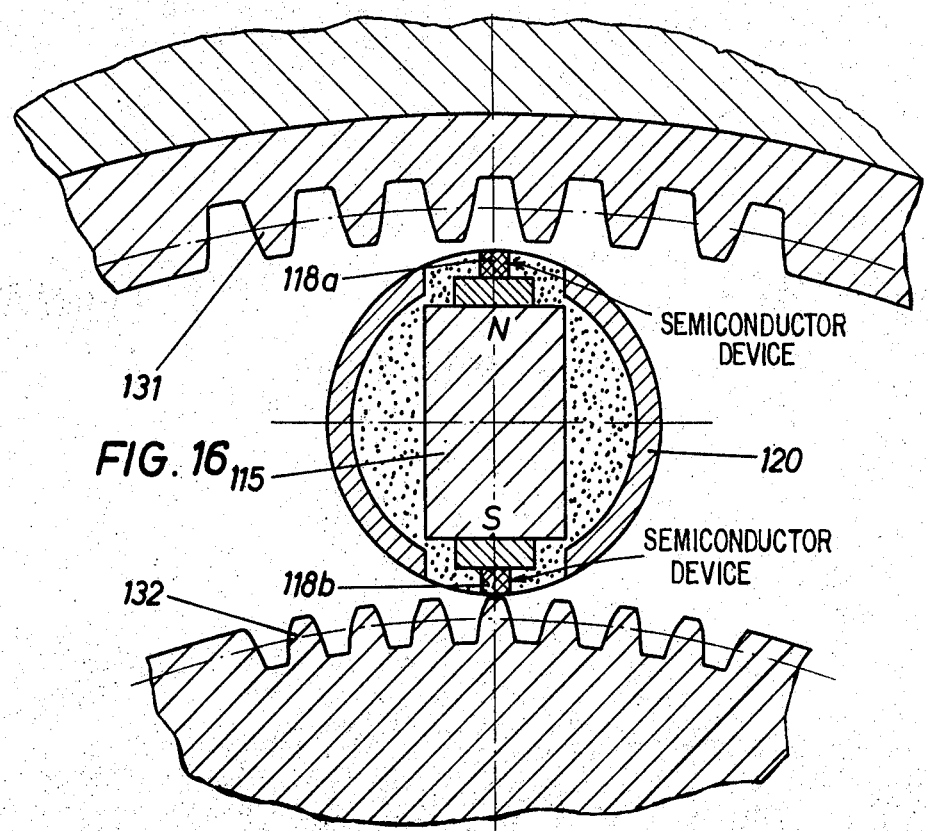
FIG. 16
FIG. 13
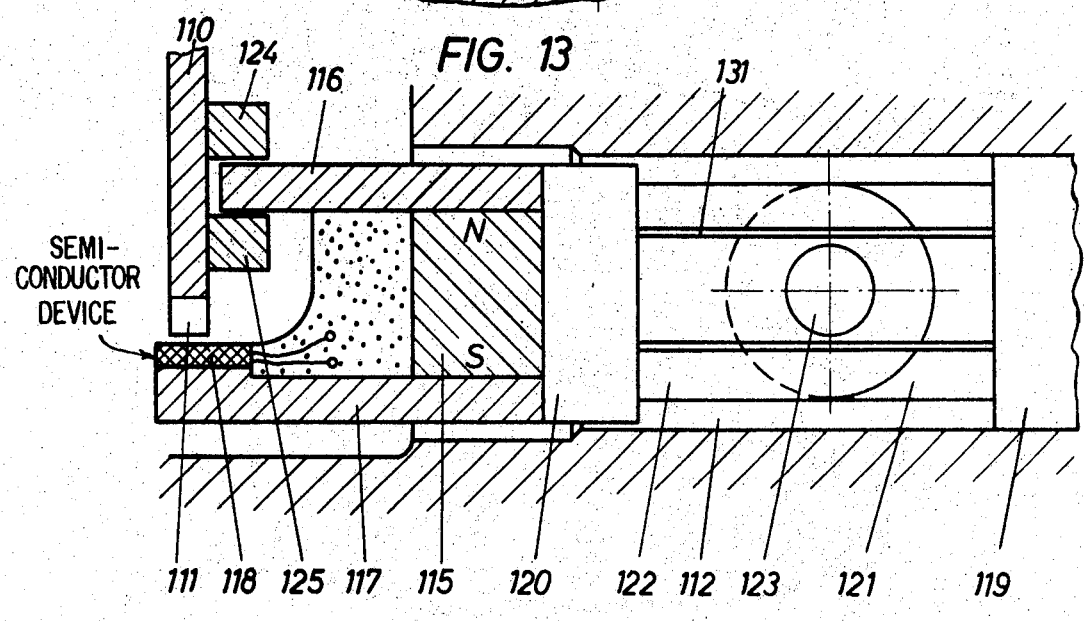

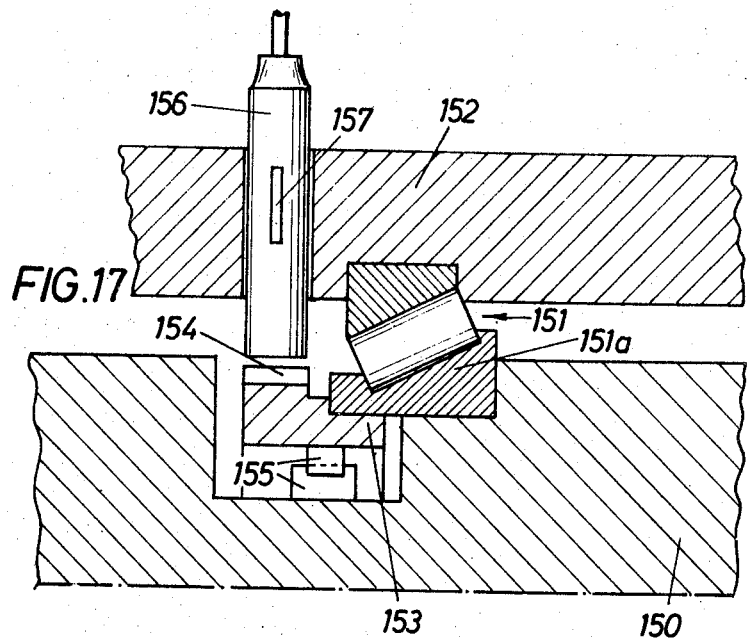
FIG. 17
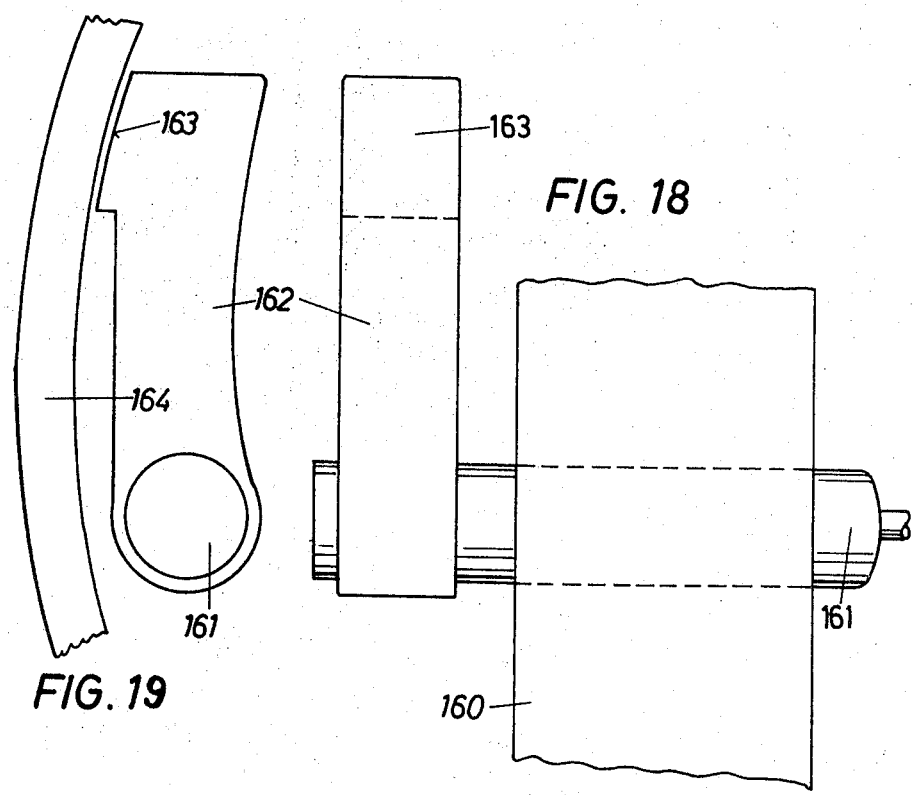
FIG. 18
FIG. 19

3,793,545

SPEED SENSING APPARATUS

BACKGROUND OF THE INVENTION

This invention relates to a rotational speed sensing apparatus for determining the angular speed between two components rotating with respect to one another.

The present invention relates, more particularly, to an electromagnetic rotational speed sensing apparatus for determining the angular speed between two components rotating with respect to one another, particularly a wheel sensor for antiblocking systems of motor vehicles. The speed sensing apparatus of the present invention is of the type which has a magnetic circuit comprising rotor and stator portions, an air gap disposed between the rotor and stator which is varied in size by recesses or teeth of the rotor when the rotor rotates and an electromagnetic sensor on the stator which converts the changes in the air gap size into electrical signals.

Such rotational speed sensing apparatuses are known, for example, from the German Offenlegungsschriften (Laid Open Patent Applications) Nos. 1,911,487 and 1,911,488. These two publications relate to the problem of operatively associating rotational speed sensors with components which can rotate with respect to one another and whose type of mounting permits a relatively large amount of play, as for example the mount between the kingpin and the wheel hub of a motor vehicle wheel. In view of the relatively high demands for accuracy of the electrical output signals, it is normally impossible to simply and rigidly fasten the stator and the rotor of the rotational speed sensor to the respective components. The changes in air gap due to play of the wheel bearing or due to bending of the wheel axle would cause too much interference in the electrical signal.

The above-mentioned publications, therefore, show that individual slide surfaces can be provided which assure mounting of the rotor to the stator substantially without play, a flexible or loose driving connection being provided between the rotor and/or stator and the respective component. The slide surfaces in the known arrangements are actually designed to be bearing surfaces, are partially lubricated and are intended to remain in constant contact in order to assure an unchanging, small air gap between the rotor and the stator even when there is movement due to radial or axial wheel bearing play and when the wheel axle is bent.

Such drive connections, in the form of spring elements or claw couplings, are very complicated and constitute an operating risk due to the danger of the material of the components breaking.

SUMMARY OF THE INVENTION

It is the object of the present invention to solve in a simple but safe manner the basic problem of producing a useful electrical speed signal in spite of the difficult mounting of the components which are movable with respect to one another.

The foregoing object, as well as others which will become apparent from the test below, is accomplished according to the present invention in an electromagnetic speed sensing apparatus having a magnetic circuit formed by a rotor, a stator and an air gap between the rotor and the stator. The rotor has a surface provided with recesses or teeth. The stator is provided with an electromagnetic sensor. The air gap is changeable in size during rotation of the rotor by the teeth or recesses. Oppositely disposed surface portions of the stator and the rotor are developed to permit possible contact between them without damage. Static friction producing means are provided which permit movement of the stator toward and away from the rotor only upon overcoming substantial static friction.

The described known constructions with loose or flexible drive connections are, strictly speaking, not required, because of the wheel bearing play or because of the radial displacement of the axle due to bending, but in order to master the fabrication and installation tolerances. A quite considerable installation tolerance must be tolerated because usually several individual tolerances are added together.

Of the two groups of radial and axial tolerances it is known to eliminate one group by the suitable design of the magnetic system. Thus, it is possible, for example, for a rotor with radially protruding teeth, to widen these teeth in the axial direction with the result that movement due to axial play between rotor and stator will have no influence on the electrical measuring result. It is also possible, for a rotational speed sensing apparatus whose pole surfaces lie in a plane perpendicular to the axis of rotation, to extend the teeth or recesses in the rotor or in the stator poles in the radial direction to permit radial play movements. The critical factor is then only the respective other direction of movement between the rotor and the stator which influences only the magnetic air gap. If the rotor and the stator are individually adjusted to one another in this direction and the air gap is thus truly limited to the unavoidable wheel bearing play or the bending, respectively, the rotational speed sensing apparatus will meet the electrical requirements.

The present invention utilizes this knowledge and designs the stator in such a manner that zero air gap will automatically result during installation, i.e. stator and rotor contact one another. On the other hand, the stator is arranged to be yielding enough so that sticking is avoided. This characteristic, however, is not an elastic yielding but a yielding in the sense of overcoming an intentional frictional contact so that the rotor provides itself just enough room for it to rotate and the stator remains in the corresponding position.

It is thus characteristic for the rotational speed sensing apparatus according to an embodiment of the present invention that in contradistinction to the above mentioned state of the art, changes in the magnetic air gap coincide with the wheel-bearing play movements. The rotor is always firmly seated in the rotatable component and during operation the stator also no longer moves with respect to the rotationally secured component so that elastic or loose coupling members are not required.

According to a further feature of preferred embodiments of the present invention, slide surfaces are provided on the rotor and the stator in order to permit contact therebetween without damage. These slide surfaces are preferably disposed at a point facing away from the recesses or teeth and extend somewhat further than the recesses or teeth in order to avoid damage of or by the teeth. However, the interstices between the teeth can also be filled with a nonmagnetic material and thus permit contact of the teeth or the coating of nonmagnetic material around the teeth with the stator.

The electromagnetic sensor may be a coil through which the magnetic flux passes or a semiconductor exposed to the magnetic field and disposed, for example, in one of the air gaps between rotor and stator.

According to a further feature of preferred embodiments of the present invention, the voltages provided at the stator can be increased by the use of, particularly, two magnetic field sensitive semiconductor devices. These semiconductor devices favorably are so disposed on the stator so that with a maximum influence on the one semiconductor device by the magnetic field, the other semiconductor device is exposed to just a minimum of influence. If these semiconductor devices are arranged in different branches of a bridge, an increased output signal is obtained at the bridge diagonal. The two semiconductor devices can be so arranged on the stator that they lie opposite different teeth of the toothed rotor. They thus lie in the plane of the toothed wheel in a position where they are turned by a certain angle with respect to one another. It is however also possible to provide two concentric toothed rings on the rotor with the outer ring having teeth toward the inside and the inner ring teeth toward the outside. The actual stator member is then disposed between the two toothed rings in such a manner that the two semiconductor devices lie opposite different toothed rings. The rotor may also be designed as a ring with inner and outer teeth and the two semiconductor devices may be held by a fork-like member passing around this ring. The semiconductor devices and the toothed rings may also be displaced with respect to one another in the direction of the axis of the toothed wheel.

Preferably the rotational speed sensing apparatus will be disposed in the area of the wheel bearing, for example, between the two bearings or - as made possible by the small size of the magnetic field sensitive semiconductor employed - between the inner wheel bearing and the associated wheel bearing seal. Additional seals are, as a result, eliminated.

The sensing apparatus according to the present invention is preferably designed to comprise a rod-shaped unit which can be inserted into an opening of the stationary component, i.e., in a vehicle, for example, the axle housing, in the direction toward the rotor teeth. As will be shown below, the opening may be disposed either parallel or perpendicular to the rotor axis.

The recesses or teeth of the rotor can extend axially or radially - as will become evident from the examples; the stators however must be correspondingly designed and installed. Outer and inner teeth are possible on the rotor.

Instead of the unit displaceable in the direction of the axis of the opening, a unit can also be used in which the approaching or moving away from the rotor is effected by a pivoting movement. In this instance, the stator includes an approximately rod-shaped part which is inserted into an opening in the stationary component and of a crossbar or lever which bears the effective stator parts (i.e. sensor, magnet and stator yokes). By rotating the rod-shaped portion, the rotor teeth are brought closer or further away. Consequently, the rotation of the rod-shaped portion must be effected while overcoming static friction.

The insertable unit may be formed, according to a further embodiment of the present invention, of two jointedly connected parts, one of which serves to fasten the unit in the opening and the other of which bears the actual stator and can be set at an angle thereto. If the appropriate means are provided at the rotor and at the stator end, the desired alignment of the stator with respect to the rotor is produced when the insertable unit is inserted. Consequently, openings which are not absolutely accurate have no damaging effect.

In the variation described above, the configuration of the magnetic system of the stator is based on magnetic indicators as they are illustrated in Bulletin F-8, dated June 28th, 1968, of the firm Airpax Electronics Seminole Division, Fort Lauderdale, Fla. In a further embodiment of the present invention, it is proposed that a connecting housing be provided which can be fastened to a supporting component and to which a connecting line for the magnetic coils is fastened with stress relief and that the stator can be displaced with respect to this connecting housing which partially surrounds it. The connecting line between the connecting housing and the magnetic coil disposed on the stator may be a flexible line or a plug-in connection comprising male and female plug portions. In the former instance friction reinforcing means are required, while in the latter case the plug-in connection alone produces the static friction or at least partially produces it.

Rotational speed indicators with a stator movable in axial direction according to the present invention should be of importance particularly for vehicle wheels which are mounted on a non-rotatable kingpin. For this use, it is proposed that the stator be inserted into an axial opening disposed at the front end of the kingpin and have pole surfaces which are approximately perpendicular to the axis of rotation and that the rotor which is in the form of an annular disc is fastened in a housing which is screwed into the hub of the wheel while enclosing the stator.

Before installation of the rotational speed sensing apparatus of the present invention, it should principally be noted that the displaceable stator is set to that end position in which it will contact the rotor as early as possible. To assure that this will not be forgotten when the stator is removed, before it is reinstalled, it is further proposed that a spring arrangement be provided which is released when the stator or rotor are removed and which automatically effects that the stator remains in contact with the rotor while overcoming the contact friction or follows it so that upon reinstallation the initial contact between rotor and stator is assured.

It has been found to be favorable to place at least one surface or a portion of one surface of the annular toothed rotor against the rotating bearing ring of the wheel bearing and to connect the ring secured against rotation with the rotatable component. This produces accurate positioning of the rotor.

It should be mentioned that in addition to the above-discussed application of the invention to vehicles, use is also possible in machine tools and other machines in which speed sensing is desired.

BRIEF DESCRIPTION OF THE DRAWINGS

FIG. 13 is a sectional view of an additional preferred embodiment according to the present invention having a stator provided with a joint.

FIG. 16 is a sectional view of a further speed sensing apparatus having two magnetic field sensitive semiconductors as sensors according to another preferred embodiment of the present invention.

FIG. 17 is a sectional view of a speed sensing apparatus having a radially inserted stator and a rotor ring in contact with the rotatable wheel bearing ring according to yet another preferred embodiment of the present invention.

FIGS. 18 and 19 are front and side sectional views respectively of speed sensing apparatuses in which the approach or the removal between the rotor and the stator is effected by rotation or pivoting, respectively, according to still further preferred embodiments according to the present invention.

DETAILED DESCRIPTION OF THE PREFERRED EMBODIMENTS

Figures 1, 2:
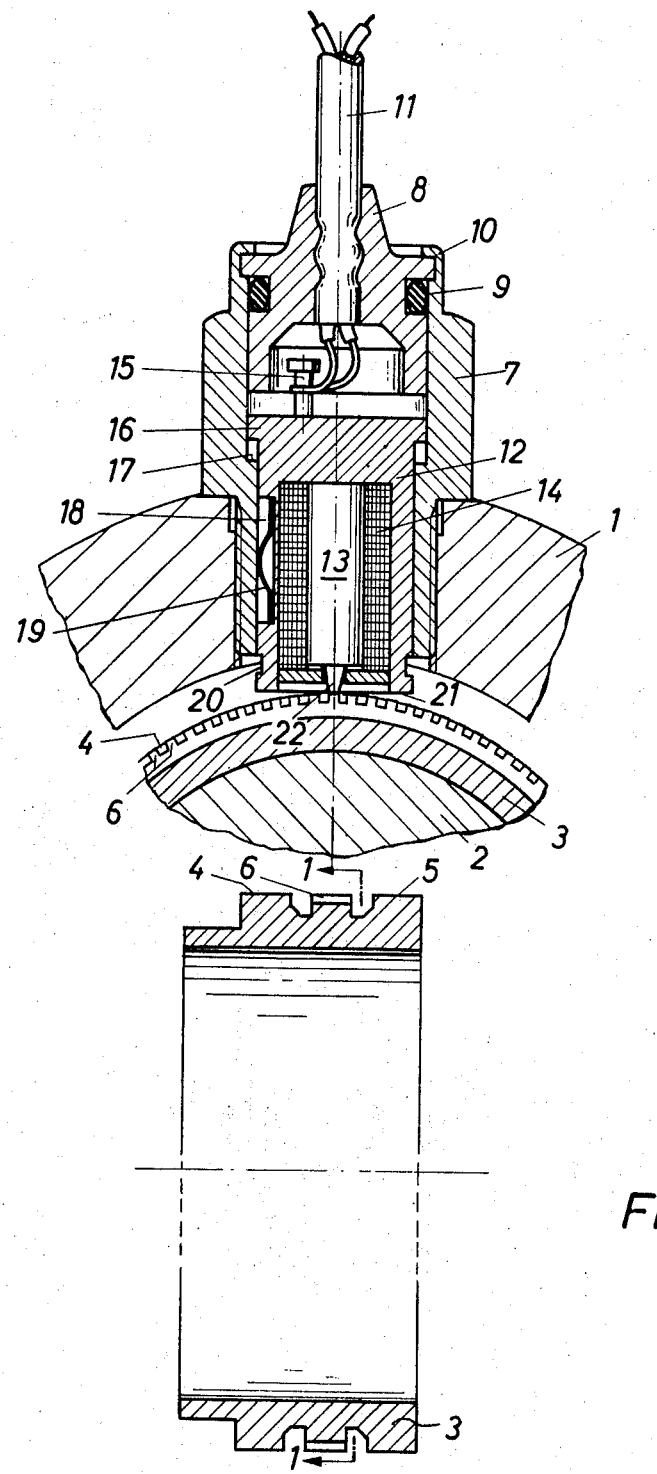
FIG. 1 is a sectional view through a first rotational speed sensing apparatus having a radially displaceable stator, flexible electrical leads between a connecting housing and the stator, and a coil as the electromagnetic sensor according to an illustrative embodiment according to the present invention.
FIG. 2 is a longitudinal section through the rotor shown in FIG. 1.
Figure 3:
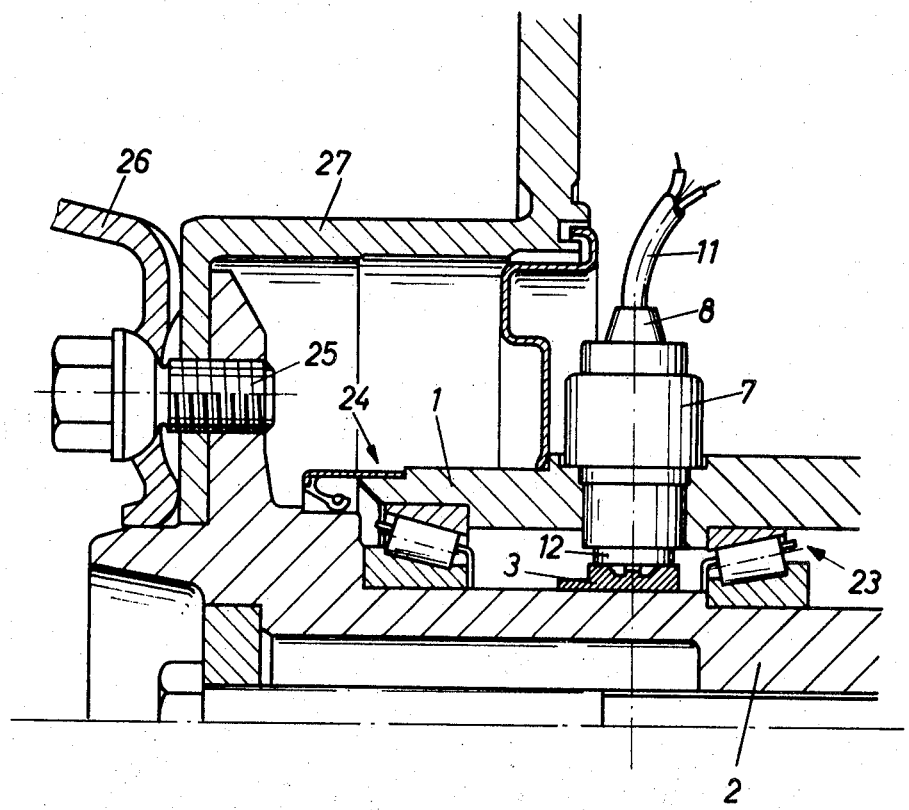
FIG. 3 is a sectional view of an installation of the rotational speed sensing apparatus of FIG. 1 in an axle construction associated with a driven wheel.

Referring now to FIGS. 1–3, an installation is shown which includes an axle housing 1 and a drive shaft 2 rotating therein.

The rotational speed of the axle housing 1 and the drive shaft 2 with respect to one another is to be measured with the rotational speed sensing apparatus according to the present invention. A rotor ring 3 is pressed onto the drive shaft 2. This ring, shown in detail in FIG. 2, has three raised ring areas of substantially the same diameter, the superficies of the two outer ring areas, indicated respectively by the numerals 4 and 5, serving as the slide surfaces. The center ring area is provided with quadratic, outwardly directed teeth 6.

The connecting housing 7 is screwed into the axle housing 1. The connecting housing 7 is closed toward the top by an insert 8 which is sealed by means of an O ring 9 and abuts an upper crimped edge 10 of the connecting housing 7. The insert 8 provides a central passage and clamping point for a thickly coated, flexible cable 11 which has two electrical conductors.

The stator is displaceably and frictionally mounted in the interior of the connecting housing 7. The stator includes a basic stator body 12 which has the approximate shape of a cup and a pole member 13 coaxially disposed and fastened in the interior of the stator body 12. The pole member 13 may be constructed as a rod magnet or may be, as illustrated, a core of magnetizable material which becomes a magnet due to a direct current in a winding 14 which is positioned about the pole member 13. The winding 14 is connected to two connecting pins, one connecting pin 15 being visible in FIG. 1, in a conventional manner not shown in detail. The two flexible conductors of the connecting cable 11 are soldered to these pins.

The basic stator body 12 is provided at its top with a collar 16 which cooperates with an interior protrusion in the form of an abutment 17 of the connecting housing 7 and which limits the downward movement of the stator. The upward movement of the stator is limited by a shoulder on the insert 8. The basic stator body 12 is provided with a plurality of short longitudinal grooves 18 which are distributed over its circumference, and one of these grooves 18 being visible in FIG. 1. Corrugated leaf springs 19, one being shown in FIG. 1, are disposed in the grooves 18 to increase the friction between the stator and the connecting housing 7. At the lower end of the basic stator body 12 there is an annular groove 20 which is provided to offer the possibility of removing the basic stator body 12 from the connecting housing 7, after disassembly, up to the abutment 17.

The illustrated rotational speed sensing apparatus of FIGS. 1–3 operates as follows, insofar as the present invention is concerned. After the basic stator body 12 has initially been inserted into the connecting housing 7, as already mentioned, until it abuts the abutment 17, the connecting housing 7 is screwed into the axle housing 1. Before the connecting housing 7 is completely screwed in, however, a lower annular frontal face 21 of the basic stator body 12 comes in contact with the two slide surfaces 4 and 5 of the rotor.

This prevents a slightly set back pole tip 22 of the pole pin 13 from touching the rotor teeth 6 of the rotor ring 3. Depending on the individual dimensions within the production tolerances, the stator will be pushed into the connecting housing 7 to a greater or lesser extent until it sits tight. It is assured, however, that during installation the stator will take up this basic position with respect to the rotor in any case, this being the position where the air gap has a constructively given minimum. If axial bearing play occurs between drive shaft 2 and axle housing 7, this has no magnetic consequences because the magnetic flux distribution is not changed due to the axial dimensions of the teeth 6 and the slide surfaces 4 and 5. If radial bearing play occurs, the rotor moves away from the stator within the range of this play or presses the stator further into the connecting housing 7. The respective position attained by the stator is maintained due to the intentionally provided contact friction between the springs 19 and the housing 7. In this manner the air gap can never become greater than the radial bearing play.

In the installation as illustrated in FIG. 3 the rotational speed sensing apparatus according to FIG. 1 is again shown in a smaller scale in a more distant view. The drive shaft 2 is mounted in the stationary axle housing 1 by means of two conical roller bearings 23 and 24. The drive shaft 2 widens on the left side into a flange to which a wheel rim 26 and a brake drum 27 are fastened by means of a plurality of lug bolts, one lug bolt 25 being visible in FIG. 3.

Figure 4:
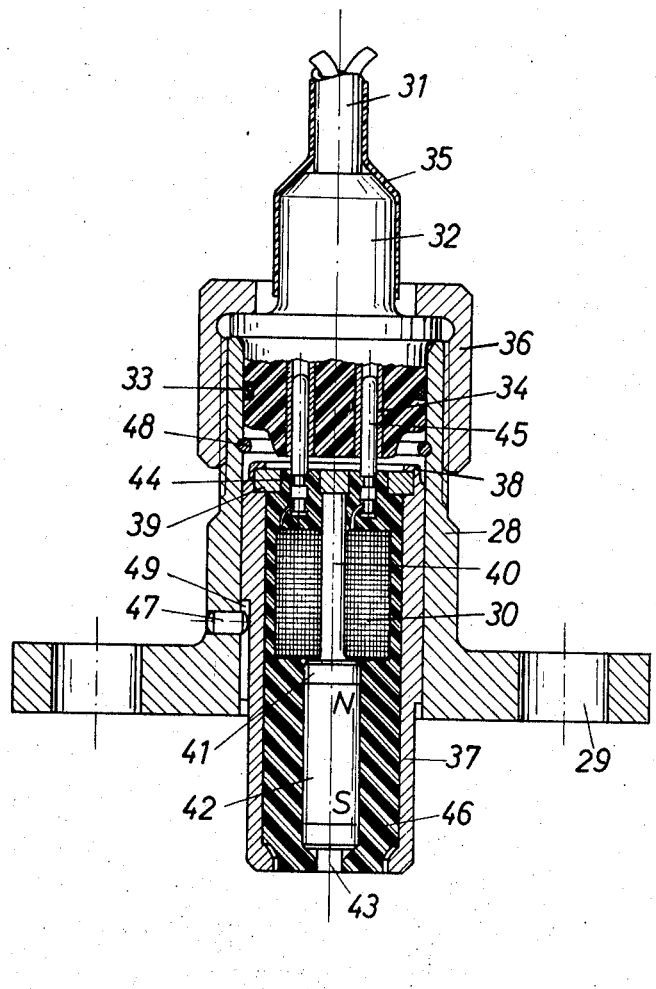
FIG. 4 is a longitudinal sectional view through a portion of a second embodiment of the present invention similar to the speed sensing apparatus shown in FIG. 1.

The embodiment of the speed sensing apparatus partially illustrated in FIG. 4 differs from that of FIG. 1 in the configuration and the attachment of its connecting housing 28 to the supporting component (not shown) and in the special type of conductive connection between its stator winding 30 and conductors within an outgoing connection cable 31. The connecting housing 28 is provided with a tubular center portion which ends at the bottom in a strong, outwardly directed fastening flange. Bores 29 in the fastening flange are provided to receive strong fastening bolts or the like.

A cast resin body 32 is inserted from the top into the tubular portion of the basic connecting housing body 28 and is sealed by means of an annular seal 33. The cast resin body 32 is shown broken open in its lower section and contains two plug sockets 34 with which the ends of the two conductors in the outgoing cable 31 are connected in a conventional manner not shown in detail. An elastic cover member 35 is pulled over the jacket of the outgoing cable 31 and the upper portion of the cast resin body 32 in order to provide a seal and tension relief. The connection of the cast resin body 32 to the connecting housing 28 is effected by a cap screw 36.

In the lower portion of the basic connecting housing body 28 a stator sleeve 37 is displaceably mounted. By crimping the upper edge 38 of the stator sleeve 37, a bottom portion 39 is connected with the stator sleeve 37. This is followed toward the bottom by a central pole pin 40 surrounded by the stator winding 30. The pole pin 40 becomes wider at its lower portion 41 to attain the larger diameter of a cylindrical permanent magnet 42 which is magnetized in axial direction. The lower end of the permanent magnet 42 is followed by a pole pin 43 with initially the same diameter, the magnetic flux exiting at its lower smaller pole surface. The entire stator sleeve 37 is filled with cast resin 46 which binds together all components contained therein.

The bottom portion 39 has two bores 44 which have the same spacing as the plug sockets 34. Two plug pins 45 which are also firmly anchored in cast resin extend upwardly through the bores 44. The pins 45 are connected with the terminals of the stator winding 30 and fit into the plug sockets 34. The friction between the plug pins 45 and the plug sockets 34 is so adjusted that sufficiently strong fixing of the stator with respect to the connecting housing 28 is assured. The displaceability of the stator in the housing 28 is limited toward the top by a safety ring 48 and at the bottom by an abutment pin 47 which engages in a longitudinal groove 49 in the stator sleeve 37.

The rotational speed sensing apparatus according to FIG. 4 also cooperates with the same or a similar rotor as that shown in FIGS. 1 and 2.

Figure 5:
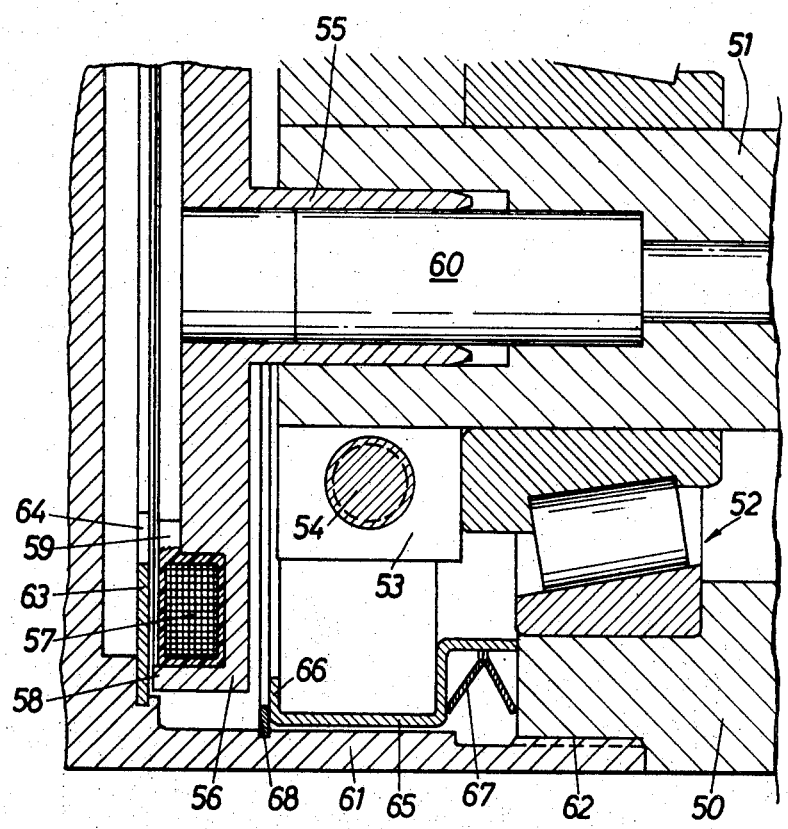
FIG. 5 is a partially longitudinal section through a rotational speed sensing apparatus provided with an axially movable stator and a coil as the sensor according to another embodiment of the present invention.

The embodiment according to FIG. 5 shows a speed sensing apparatus according to the present invention in which the magnetic flux flows in axial direction in the air gap and the stator is also disposed to be axially displaceable. The two components which can be rotated with respect to one another, as illustrated in FIG. 5, are a wheel hub 50 on the one hand and a stationary kingpin 51 on the other hand. Two conical roller bearings are provided, only one 52 being visible in FIG. 5. The roller bearings are adjusted in a conventional manner by means of a threaded setting ring 53 which is threadably connected to the kingpin 51 and which presses the inner bearing ring associated with the conical roller bearing 52 toward the right. The setting ring 53 is transversely slitted at one point, as can be seen in the lower half of FIG. 5, and is secured in its position by tightening a clamping screw 54. To this extent, the wheel bearing construction is conventional.

The stator in the rotational speed indicator will now be described. It includes a sleeve tube center portion 55 which becomes wider on its left side in a radially outward direction to form a massive flange-type structure 56. This is the actual stator. It has a larger annular groove which is open toward the left and which holds a coil 57; it has an annular pole surface 58 directed toward the left with a larger diameter as well as a number of pole teeth 59 which point toward the left and which are arranged in a circle of smaller diameter radially inward from the coil 57. The teeth 59 are slightly set back with respect to the pole surface 58. The gaps between the teeth and the coil 57 are preferably encased in cast resin and are thus fastened to the stator. The stator is secured against rotation in a conventional manner.

The rotor which cooperates with the stator is a simple annular disc 63 which has radially inwardly directed teeth 64 disposed opposite the teeth 59 of the stator. The rotor is sintered in a housing 61 and thus fastened thereto. If now the housing 61 is screwed onto the wheel hub 50 by means of its thread 62, the annular disc 63 will initially come in contact with the pole surface 58 of the stator and during further screwing the stator is carried along, i.e., its sleeve-type center portion 55 is pressed further into the frontal bore in the kingpin 51 in which a cylindrical body 60 may be fastened, as shown, to improve the static friction. In order to increase the friction contact between this sleeve-shaped center portion 55 and the kingpin 51, longitudinal grooves may be provided in the center portion 55 similar to FIG. 1 in which tension springs are pressed against the inside of the bore. Radial wheel bearing play does not have any influence on the magnetic conditions of this speed sensing apparatus because the rotor and the rotor teeth are sufficiently large in their radial extent. On the other hand, the air gap is automatically set to its least possible value during the preceding installation, as in the preceding embodiments, and axial bearing play can only increase it to the true value of this play.

In order to provide for the automatic resetting of the stator when the sensor housing, and thus the rotor, is removed, a ring 65 is additionally mounted in the housing 61 to be slightly axially displaceable. The ring 65 has an inwardly directed flange 66 on its left side. A plurality of cup springs, only one spring 67 being visible in FIG. 5, are supported by the wheel hub 50 and press the ring 65 against an abutment ring 68 which is inserted in the housing 61. In the illustrated state, the cup springs 67 are compressed. If, however, the housing 61 is screwed off, the abutment ring 68 releases the ring 65 to an increasing degree and the cup springs 67 then exert a pressure toward the left on the stator via the ring 65 and its flange 66. The stator is thus pushed to the left to such an extent that it will definitely come to contact the rotor when the housing 61 is screwed back on.

The above described embodiments contain a coil as the sensor. In the following description several embodiments will be described which use a magnetic field sensitive semiconductor device.

Figure 6:
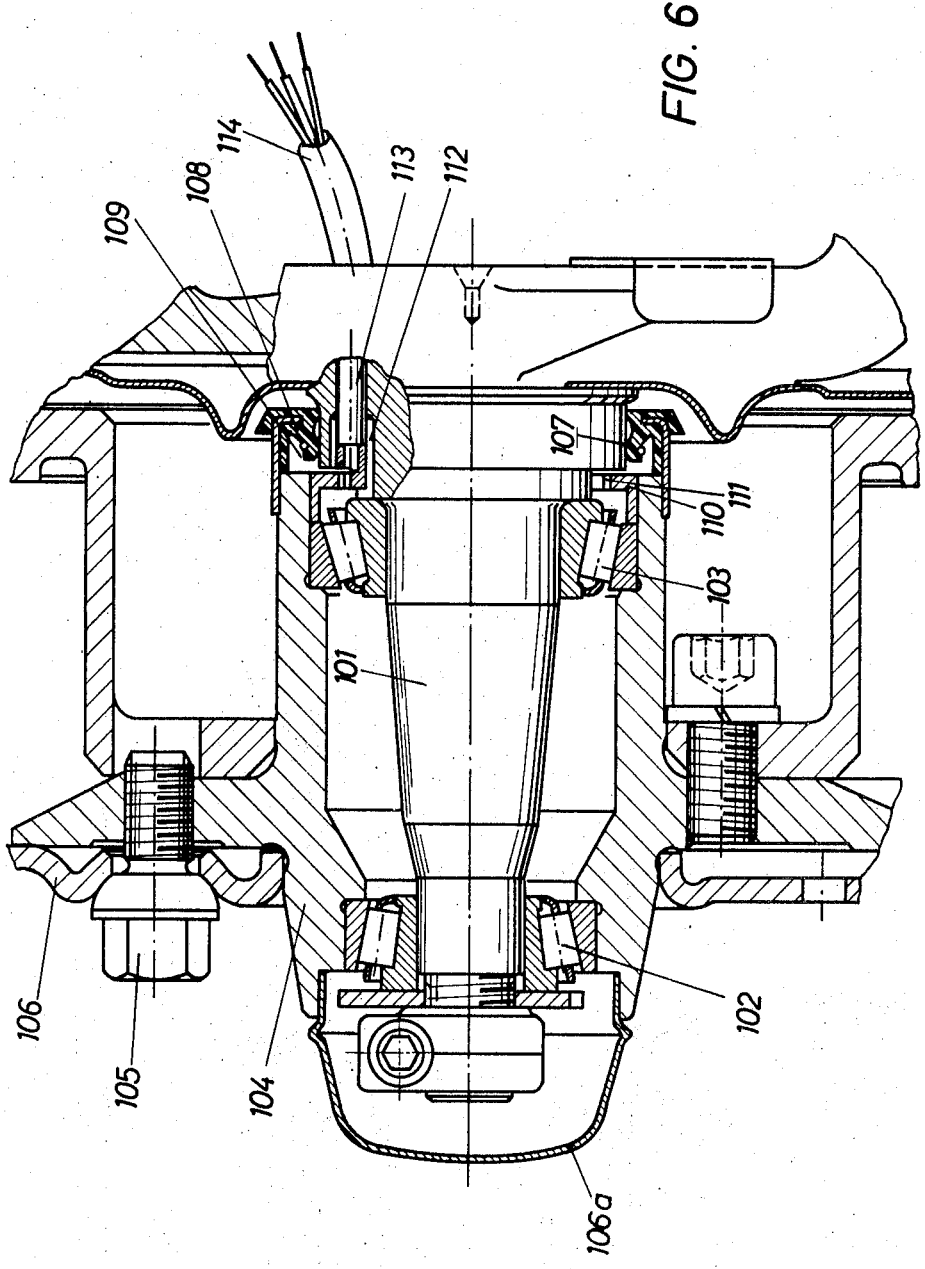
FIG. 6 is a sectional view of an installation of a rotational speed sensing apparatus having an axially insertable stator and provided with a semiconductor as the sensor according to a further embodiment of the present invention.

FIG. 6 illustrates an installation which includes an axle journal 101 of a vehicle. A wheel hub 104 is rotatably mounted on the axle journal 101 by means of an outer bearing 102 and the inner bearing 103. A rim 106 is fastened to the hub 104 by means of lug bolts, only one lug bolt 105 being visible in FIG. 6. The bearings 102 and 103 are sealed toward the outside by a cap 106a while an inner seal is provided by a retaining ring 108 which slides on a collar 107 of the axle journal 101.

The sensor for measuring the speed of the wheel is disposed, according to the preferred embodiment of the present invention illustrated in FIG. 6 in a chamber 109 between the inner wheel bearing 103 and the retaining ring 108. The hub 104 bears a toothed part 110 which at its radially directed end protrusion has inner teeth 111. The axle journal 101 is provided with a bore 112 in the axial direction and closely adjacent a collar 107, the bore 112 becoming wider at its left end. In this bore a stator 113 is inserted from the rear as provided by the present invention. The stator 113 may be provided with spreading pieces or the like which effect a relatively firm mount in the axle journal opening 112 and it may permit automatic setting and allow easy installation and disassembly. The stator 113 is directly connected without the use of a plug to a cable 114 which leads to the evaluation circuit.

Figure 7:
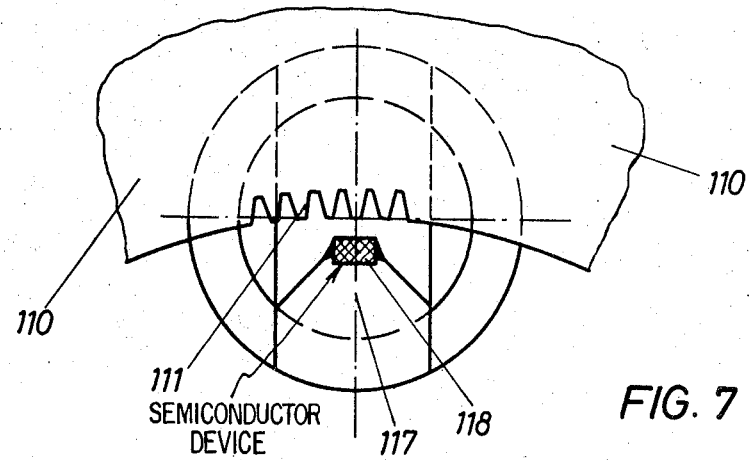
FIG. 7 is an enlarged partial view of FIG. 6 as seen from the direction of the inner wheel bearing forming part of the installation.
Figure 8:
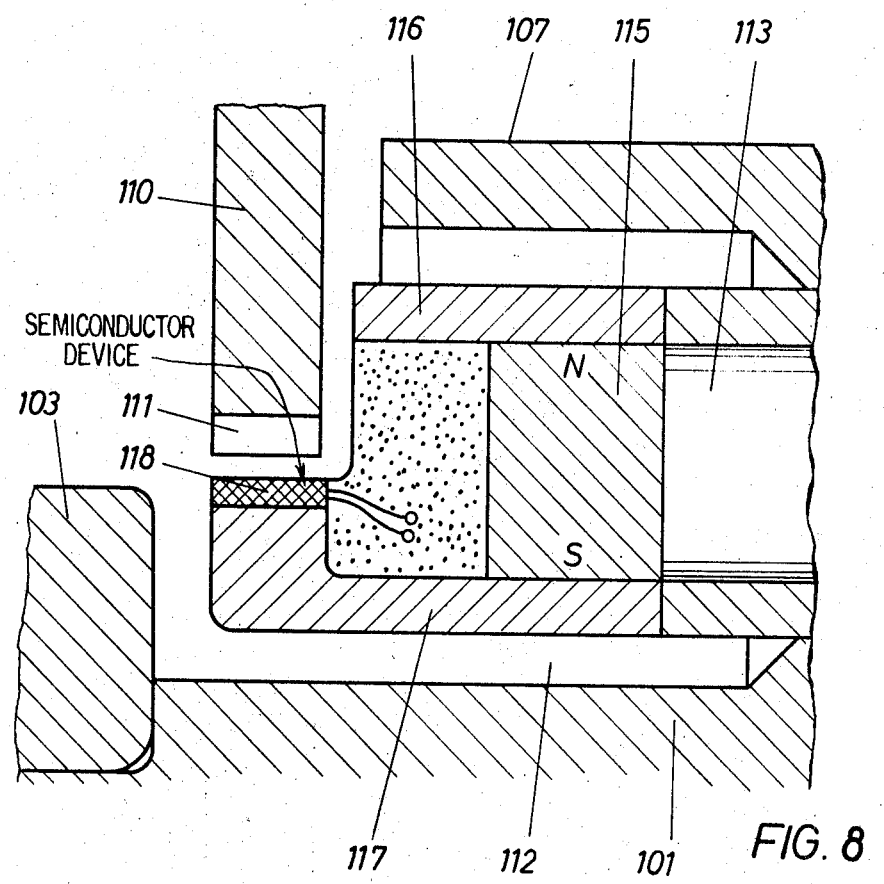
FIG. 8 is an enlarged sectional view of the speed sensing apparatus construction shown in FIG. 6, illustrating particularly the position of the radial teeth.

FIGS. 7 and 8 show the construction of the sensor of FIG. 6 in more detail. The toothed part 110 which is fastened to the wheel hub 104 and which can be seen only in part in the sectional view of the sensor shown in FIG. 8 and in the partial view as viewed from the wheel bearing as shown in FIG. 7, also bears the reference numeral 110; correspondingly, its inner teeth are also marked 111. In FIG. 8 the axle journal 101 can be seen only in part, likewise the inner bearing 103. Next to the collar 107 in the bore 112 into which the stator 113 of the sensor is inserted. It consists of a magnet 115, and yoke pieces 116 and 117 made from magnetic material and a magnetic field dependent semiconductor device 118 which are placed on a tubular part of nonmagnetic material. The thus formed magnetic circuit - the magnet 115, the yoke piece 116, the toothed part 110, the semiconductor device 118 and the yoke piece 117 - changes its magnetic flux in dependence on whether the end of the yoke piece 117 and the semiconductor device 118 fastened thereon happen to be opposite a tooth or a gap (see FIG. 7). A modulation is produced at the output of the semiconductor device 118 when the wheel rotates whose repetition rate depends upon the number of revolutions.

Figure 9:
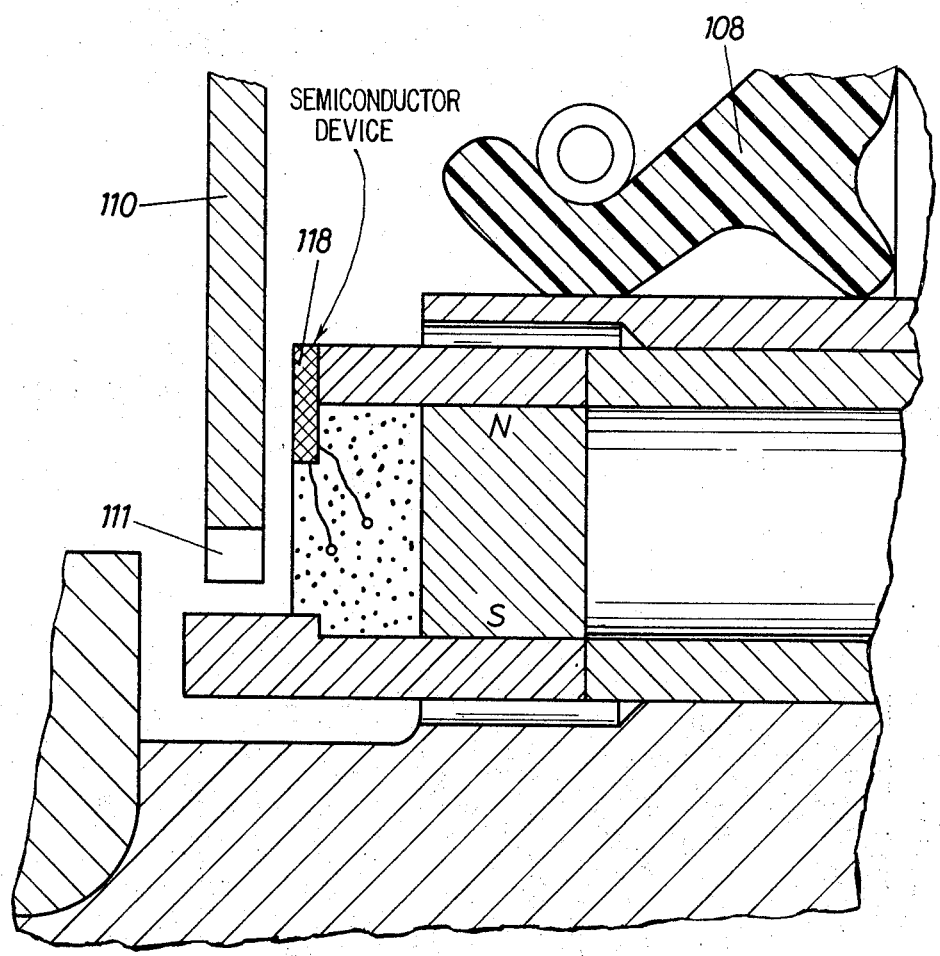
FIG. 9 is a sectional view of a speed sensing apparatus which is modified compared to FIG. 8 according to a still further embodiment of the present invention.

FIG. 9, in which like reference numerals designate like parts to those of FIG. 8, differs from the construction of FIG. 8 in that the semiconductor device 118 is positioned so that it is penetrated by an axially extending magnetic field rather than a radially extending field. This configuration is particularly easy to manufacture, and may include a retaining ring 108 similar to that shown in FIG. 6.

Figure 10:
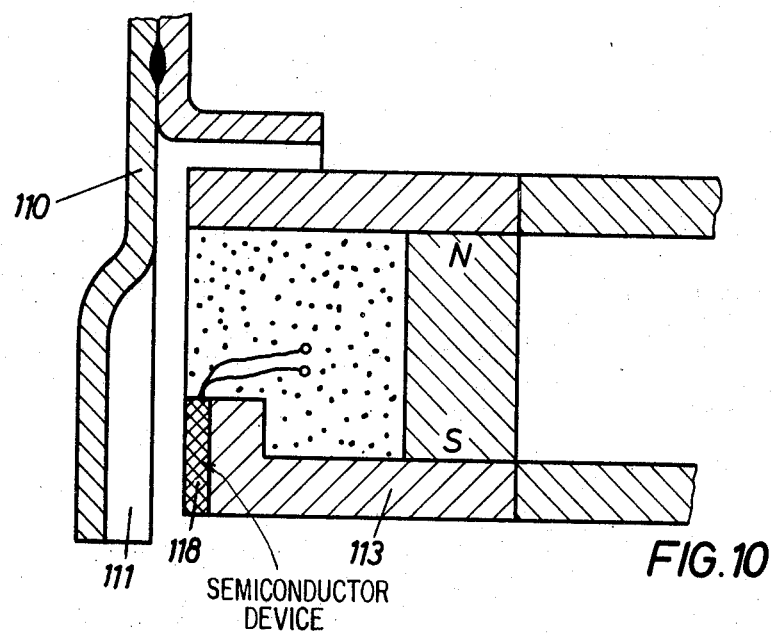
FIG. 10 is a sectional view of a speed sensing apparatus wherein the sensing apparatus has axial teeth according to still another embodiment of the present invention.

In the embodiment shown in FIG. 10 and toothed part 110 which rotates together with the hub has its teeth 111 extending in the axial direction. The semiconductor device, in this case, 118 is penetrated by an axial magnetic field. Such an embodiment has the advantage that radial play or tolerances can have no adverse effect.

Figure 11:
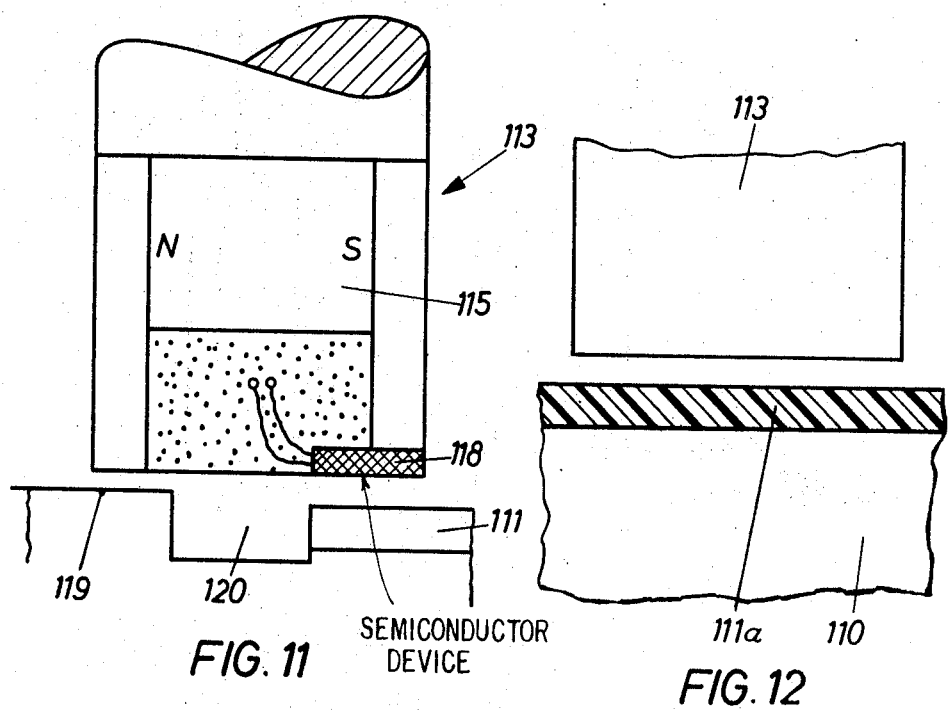
FIGS. 11 and 12 are respective sectional views of two arrangements illustrating possibilities for setting the stators so that they do not suffer damage according to preferred embodiments of the present invention.

It will be explained, with the aid of FIGS. 11 and 12, how damage to rotor and/or stator is avoided during adjustment. During installation the stator is first brought into contact with the rotor, as already mentioned. It then sets itself back during operation to the extent required in the individual case due to tolerances and axle play. Care must be taken, however, that the semiconductor device 118 and the teeth 111 are not damaged. This is accomplished, according to FIG. 11, in that the teeth 111 are a little set back with respect to the abutment collar 119. A groove 120 is provided to influence the field lines.

Figure 12:
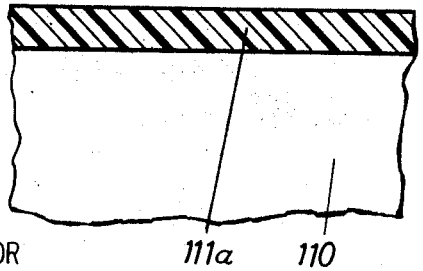

In FIG. 12 the tooth gaps 111a between the teeth 111 of the toothed part 110 are filled with nonmagnetic material and, if required, the tips of the teeth 111 are also coated with this material. Thus no danger of destruction exists even when a yoke such as portion 113 makes contact with the toothed part 110. With such a configuration, accurate axial association as in the arrangement of FIG. 11 is not required.

The embodiment of FIG. 13 shows a stator which automatically sets itself in the axial direction and in the radial direction, and in which tolerances are not as annoying. The stator inserted into an opening 112 in the axle journal which becomes wider toward the left. The stator includes two parts of which the one part 119 which is only partially visible effects the holding of the stator by friction in the opening 112 and also may have clamping or spreading members which after insertion of the stator into the opening 112 permit the automatic positioning of the stator with respect to the insertion direction. The stator part 119 is connected with a support 120 bearing the magnetic parts of the stator via a joint. The joint is formed, in this case, by movable parts 121 and 122, respectively, each conventionally fastened to the stator part 119 and the support 120, respectively. The parts 121 and 122 are connected together by a bolt 123 so as to be arcuately movable with respect to one another in the plane of the drawing, the arrangement being similar to a hinge. If required, a cup spring, for example, can press the two flap-type parts 121 and 122 against one another.

Magnet 115, a yoke piece 116 and a yoke piece 117 as well as a magnetic field sensitive semiconductor device 118 are fastened to the support 120. The rotor toothed wheel 110 which is fastened to the wheel hub, and its teeth 111 bear two concentric rings 124 and 125. The yoke piece 116 extends between the rings 124 and 125 and thus sets the semiconductor device 118 in a desired position with the aid of the joint formed by members 121–123 when the stator is being inserted. In the illustrated arrangement the air gap setting will be correct in the axial direction as well as in the radial direction. The electrical conductors can be seen between the stator part 119 and the support 120 and are generally designated by the numeral 131.

Figure 14:
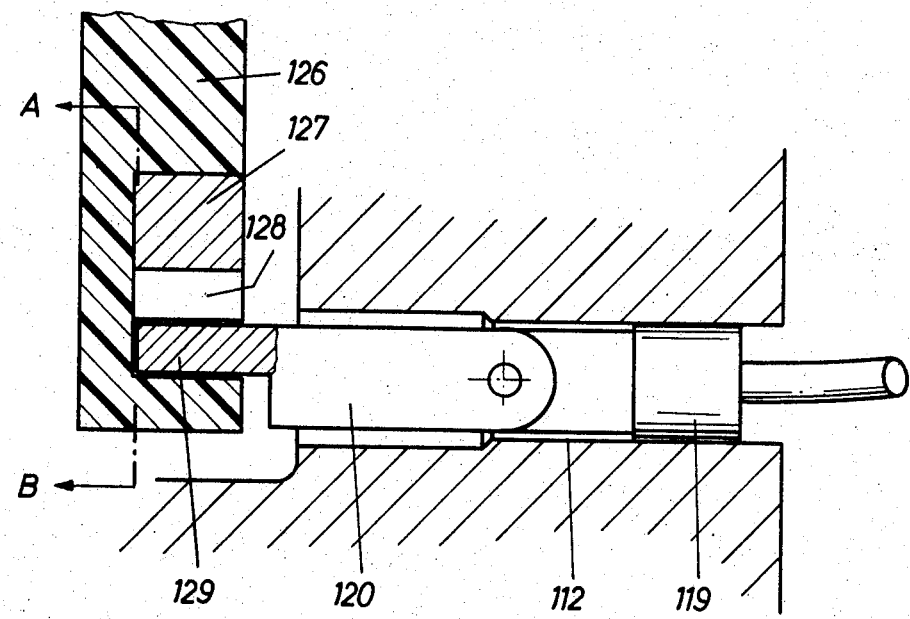
FIG. 14 is a sectional view of a speed sensing apparatus having two magnetic field sensitive semiconductors as the sensors according to a further preferred embodiment of the present invention.
Figure 15:
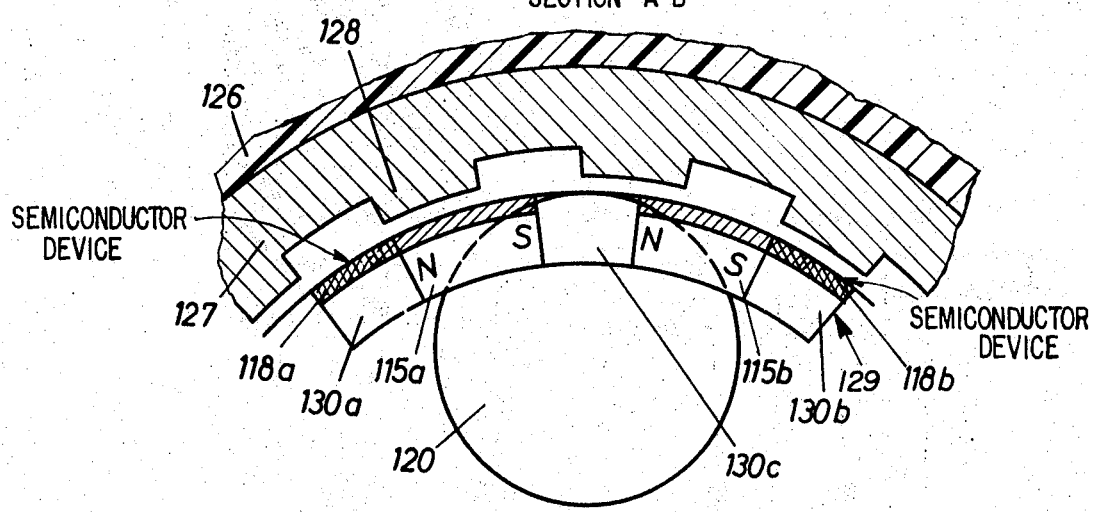
FIG. 15 is a sectional view taken along the line A—B of FIG. 14.

In the embodiment as illustrated in FIGS. 14 and 15 the rotor consists of a nonmagnetic support 126 which is provided with a ring 127 of magnetic material having inner teeth 128. The stator which is inserted into an opening 112 in the axle journal consists of two parts 119 and 120, which, as in FIG. 13, are jointedly connected together. The actual stator part is accommodated in a tongue 129 which engages in an annular recess and effects, as in FIG. 13, the correct setting of the stator parts 120 and 121 which are rotatable about the joint.

The configuration of the tongue 129 can be seen in the sectional view A—B according to FIG. 15 where the visible stator part is again designated 120. The tongue 129 is made wider. It has two magnets 115a and 115b, three yoke pieces 130a and 130b and 130c as well as two magnetic field sensitive semiconductor devices 118a and 118b. Of these semiconductor devices the one semiconductor device 118b happens to be disposed opposite a particular tooth 128 and the other 118a opposite a gap between the teeth 128. When the semiconductor devices 118a and 118b are connected in a bridge there results an increased output voltage since the two semiconductor devices 118a and 118b in the illustrated position are influenced by different size fields.

Another possible embodiment according to the present invention having two magnetic field sensitive semiconductor devices 118a and 118b is shown in FIG. 16 where the rotor has two rings of teeth 131 and 132, between which the stator 120 extends with a magnet 115 and the two semiconductor devices 118a and 118b disposed thereon.

The described FIGS. 6–16 show rotational speed indicators as they can be used for nondriven wheels.

FIG. 17 shows an embodiment which can be used with a driven shaft in which a further improvement is realized by the utilization of a rotatable bearing box as the abutment surface for the rotor.

In the embodiment of FIG. 17, an arrangement is shown which includes a drive shaft 150, an axle journal 152 in which the drive shaft 150 is mounted by means of bearings, only one bearing 151 being visible in FIG. 17. A rotor ring 153 contacts a rotatable ring 151a of the bearing 151 with an axial and a radial surface portion which results in a relatively accurate alignment of the rotor and its teeth 154.

A connection secure against rotation is assured between the drive shaft 150 and the rotor via teeth 155. A radially displaceable stator unit 156 is inserted into an opening in the axle journal 152 and is disposed opposite the teeth 154. Springs, only one spring 157 being visible in FIG. 17, effect friction between the axle journal 152 and the stator unit 156 which effects holding of the stator but also permits the automatic adjustment. Here, too, a connecting cable is conventionally connected to the stator without plugs.

FIGS. 18 and 19 illustrate an embodiment in which the approaching or removal of the stator toward or away from the rotor, respectively, is effected by screwing or pivoting of the stator, respectively. FIG. 18 shows the mounting of a so-designed stator in a stationary component 160. The stator consists of a rod-shaped part 161 which is inserted into an opening in the stationary component 160. A crossbar or lever 162 is fastened to the rod-shaped part 161, a surface portion 163 of this crossbar or lever 162 abutting at the rotor. FIG. 19 shows a portion 164 of the rotor. The rotor may be provided, for example, with a surface similar to that shown in FIG. 2, however in the form of inner teeth. By rotating the rod-shaped part 161, the surface 163 is brought in contact with the rotor surface during installation, and during operation of the speed sensing apparatus the stator sets itself to the required air gap size. Spreading or clamping members must here be effective in the opening in the stationary component 160 to permit rotation of the rod-shaped part 161 and thus pivoting of the crossbar or lever 162 only while overcoming a substantial static friction.

It will be understood that the above description of the present invention is susceptible to various modifications, changes and adaptations, and the same are intended to be comprehended within the meaning and range of equivalents of the appended claims.

We claim:

1. In an electromagnetic rotational speed sensing apparatus for determining the angular speed between two components rotating with respect to one another and which includes a magnetic circuit formed of rotor means having a surface provided with teeth, stator means, an air gap disposed between the stator means and the rotor means, the air gap being changeable in size during rotation of the rotor means by the teeth and electromagnetic sensor means arranged on the stator means for sensing changes in the magnetic air gap and converting them to electrical signals, the improvement comprising stationary support means for movably supporting said stator means to permit movement toward and away from said rotor means; means for providing substantial static friction between said stator and said stationary support means to permit the movement of said stator means with respect to said stationary support means as a result of said rotor means contacting said stator means and overcoming the substantial static friction so that when said rotor means contacts said stator means with sufficient force for the static friction to be overcome, the stator means is moved away from said rotor means so as to enlarge the air gap, whereby said stator means can be initially arranged such that the air gap is set at a minimum; and the oppositely disposed surface portion of said rotor means and said stator means being formed to permit contact between them without damage.

2. An arrangement as defined in claim 1 wherein said oppositely disposed surface portions are slide surfaces.

3. An arrangement as defined in claim 2 wherein said electromagnetic sensor is a coil penetrated by magnetic flux.

4. An arrangement as defined in claim 1 wherein said electromagnetic sensor is at least one magnetic field sensitive semiconductor device which is exposed to the changing field.

5. An arrangement as defined in claim 1, further comprising a wheel bearing of a vehicle wheel, and said stator means and said rotor means are positioned in the vicinity of said wheel bearing, whereby the speed of the vehicle wheel can be sensed.

6. An arrangement as defined in claim 5, further comprising a wheel bearing seal, and wherein said wheel bearing is an inner wheel bearing, said stator means and said rotor means being disposed between said inner wheel bearing and said wheel bearing seal.

7. An arrangement as defined in claim 1 wherein said stationary support means is provided with an opening and said stator means comprises a unit insertable into said opening in said stationary support means, and further comprising a crossbar fastened to an end of said unit, said crossbar bearing the magnetic member of said stator means, said stator means being movable in said opening against the substantial static friction whereby the magnetic member may move away from said rotor means upon overcoming the substantial static friction.

8. An arrangement as defined in claim 1 wherein said stationary support means is provided with an opening, and said stator means is a plug-in unit which can be inserted into said opening in said stationary support means and is displaceable in the axial direction of said opening.

9. An arrangement as defined in claim 8 wherein said opening lies substantially parallel to the axis of said rotor means.

10. An arrangement as defined in claim 8 wherein said opening lies substantially perpendicular to the axis of said rotor means.

11. An arrangement as defined in claim 1 wherein said teeth are axially disposed and said stator means is correspondingly positioned.

12. An arrangement as defined in claim 1 wherein said teeth are radially disposed and said stator means is correspondingly positioned.

13. An arrangement as defined in claim 12 wherein said teeth define inner teeth, and an annular extending surface is provided in the vicinity of said inner teeth which surface extends radially beyond said inner teeth.

14. An arrangement as defined in claim 2 wherein said slide surface of said rotor means is provided by a slight protrusion defining a surface facing and positioned away from said teeth whereby the stator means can be set in its spacing from the teeth of the rotor means.

15. An arrangement as defined in claim 2 wherein the gaps between said teeth are filled with a nonmagnetic material so that the setting of the plug-in unit is effected by means of the teeth or the material disposed above the teeth, respectively.

16. An arrangement as defined in claim 2 wherein said stator means is developed as a plug-in unit and the gaps between said teeth are filled with a nonmagnetic material which is also disposed above said teeth whereby the position of the stator means is determined by the material disposed above the teeth.

17. An arrangement as defined in claim 8 wherein said plug-in unit comprises two jointedly connected parts of which one serves as the fastening means in said opening and the other part, which bears the magnetic member of said stator means, can be set at an angle with respect to said first part in a direction perpendicular to the plug-in direction, and further comprising means associated with said rotor means and with an end of said stator means for effecting a desired alignment of said second part with respect to said rotor means.

18. An arrangement as defined in claim 1 wherein said stationary support means comprises a connecting housing, said stator means being positioned partially within said connecting housing, a connecting cable means for said electromagnetic sensor means being connected in a stress-relieving manner to said connecting housing, said stator means being displaceable with respect to said connecting housing, which partially surrounds it, in the direction of said rotor means.

19. An arrangement as defined in claim 18, further comprising flexible conductive connection means within said connecting housing for connecting said connecting cable means to said stator means.

20. An arrangement as defined in claim 18 wherein said means for providing substantial static friction comprises a plug-in connection provided between said connecting housing and said stator means, said plug-in connection comprising male and female elements which at least partially effect said substantial static friction by contact with one another.

21. An arrangement as defined in claim 1 for a vehicle wheel mounted on a nonrotatable kingpin and further comprising said kingpin having an axial opening at its front end, a housing means and a wheel hub, and wherein said stator means is inserted into said axial opening, and said stator means is provided with pole surfaces which are disposed approximately perpendicular to the axis of rotation and said rotor means which is in the form of an annular disc fastened in said housing which surrounds said stator means and is fixedly connected to said wheel hub.

22. An arrangement as defined in claim 1 further comprising releasable spring means for automatically positioning said stator means at said rotor means while overcoming the static friction and during installation to assure initial contact between said rotor means and said stator means.

23. An arrangement as defined in claim 4 wherein said semiconductor device is disposed in said air gap between said stator means and said rotor means.

24. An arrangement as defined in claim 4 wherein said at least one semiconductor device comprises two magnetic field sensitive semiconductor devices which are operatively positioned so that during maximum influence on one of said semiconductor devices by the magnetic field the other of said semiconductor devices is subjected to minimum influence by the magnetic field.

25. An arrangement as defined in claim 24 wherein said rotor means comprises a wheel and said two semiconductor devices are positioned on an end of said stator means and are separated by a given angle from one another with respect to the center point of said wheel.

26. An arrangement as defined in claim 24 wherein said rotor means comprises two concentric rings of teeth, each ring of teeth lying opposite a respective one of said semiconductor devices.

27. An arrangement as defined in claim 1, further comprising a wheel bearing including a rotating ring, and wherein said rotor means comprises an annular rotor which bears said teeth and contacts said rotating ring of said wheel bearing with at least a portion of one surface.

* * * * *